US009211872B2

(12) United States Patent
Basin et al.

(10) Patent No.: US 9,211,872 B2
(45) Date of Patent: Dec. 15, 2015

(54) COMPOSITE ACCUMULATOR HAVING METAL INSERT

(71) Applicant: GM Global Technology Operations LLC, Detroit, MI (US)

(72) Inventors: Leonid Basin, Farmington Hills, MI (US); Edward W. Mellet, Rochester Hills, MI (US); Carlos E. Marin, Oxford, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 74 days.

(21) Appl. No.: 13/676,900

(22) Filed: Nov. 14, 2012

(65) Prior Publication Data
US 2014/0130924 A1    May 15, 2014

(51) Int. Cl.
*F16L 55/04* (2006.01)
*B60T 8/00* (2006.01)

(52) U.S. Cl.
CPC ... *B60T 8/00* (2013.01); *Y02E 60/15* (2013.01)

(58) Field of Classification Search
USPC ...................................................... 138/30, 31
See application file for complete search history.

(56) References Cited

U.S. PATENT DOCUMENTS

| 2,214,683 | A | * | 9/1940 | Spang | 138/31 |
| 2,417,873 | A | * | 3/1947 | Huber | 138/31 |
| 2,619,915 | A | * | 12/1952 | Ifield et al. | 137/565.13 |
| 2,742,929 | A | * | 4/1956 | Treseder | 138/31 |
| RE24,223 | E | * | 9/1956 | Ford | 138/31 |
| 2,934,093 | A | * | 4/1960 | Bleasdale | 138/31 |
| 3,230,976 | A | * | 1/1966 | Mercier | 138/30 |
| 3,364,950 | A | * | 1/1968 | Zajdler | 138/31 |
| 3,863,677 | A | * | 2/1975 | Tarsha | 138/31 |
| 4,566,609 | A | * | 1/1986 | Hoffmeister | 222/130 |
| 4,714,094 | A | * | 12/1987 | Tovagliaro | 138/31 |
| 4,953,591 | A | * | 9/1990 | Takagi et al. | 137/565.34 |
| 5,129,427 | A | * | 7/1992 | White et al. | 138/30 |
| 5,148,834 | A | * | 9/1992 | Reinartz et al. | 138/31 |
| 5,447,142 | A | * | 9/1995 | Bailey | 123/527 |
| 8,656,959 | B2 | * | 2/2014 | Marin et al. | 138/31 |
| 2008/0308168 | A1 | * | 12/2008 | O'Brien et al. | 138/31 |
| 2009/0126815 | A1 | * | 5/2009 | Rajabi et al. | 138/31 |
| 2009/0205731 | A1 | * | 8/2009 | Weber | 138/31 |
| 2011/0226371 | A1 | | 9/2011 | Marin et al. | |

\* cited by examiner

*Primary Examiner* — James Hook

(57) ABSTRACT

A composite accumulator includes a base defining a first cavity and having a closed end, an open end, and a fluid port in communication with the first cavity for communicating a hydraulic fluid in or out of the first cavity, a cover disposed over the open end of the base, the cover defining a second cavity, an insert disposed within the second cavity, a piston disposed within the first cavity and the second cavity, the piston sealed to the insert and translatable along an axis, and a biasing member disposed axially between the piston and the insert, the biasing member configured to bias the piston towards the base. Both the base and the cover are a plastic and the insert is a metal.

12 Claims, 1 Drawing Sheet

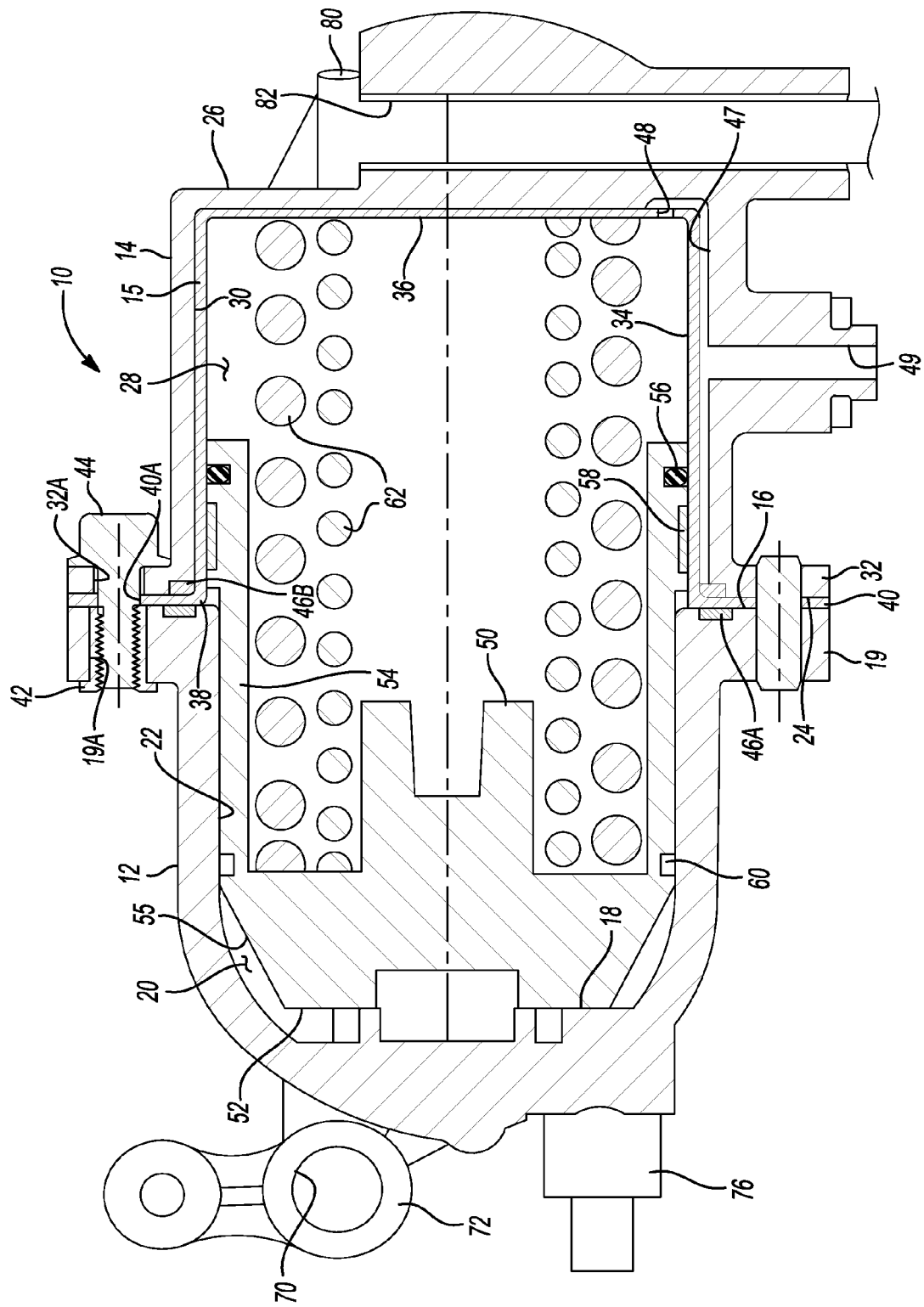

COMPOSITE ACCUMULATOR HAVING METAL INSERT

FIELD

The present disclosure relates to a composite accumulator, and more particularly to a composite spring loaded accumulator having a metal insert configured for use in motor vehicle powertrains.

BACKGROUND

The statements in this section merely provide background information related to the present disclosure and may or may not constitute prior art.

A typical automatic transmission includes a hydraulic control system that is used to provide lubrication, cooling, and control to various components of the transmission. A pump circulates the hydraulic fluid under pressure throughout the transmission. The pump is typically driven by the engine of the motor vehicle. During stop and start conditions, it is desirable to turn off the engine in order to maximize fuel efficiency. However, turning off the engine in turn turns off the pump. In order to prime control devices within the transmission, such as clutches and brakes, an accumulator may be employed within the hydraulic control system to provide pressurized hydraulic fluid to the control devices so that the control devices may be engaged quickly without waiting for the pump to deliver pressure and flow. Current accumulator designs are manufactured from castings of aluminum in order to have sufficient strength. While these accumulator designs are useful for their intended purpose, there is room in the art for an accumulator comprised of a composite of materials without reducing the performance characteristics of the accumulator.

SUMMARY

A composite accumulator is provided for a motor vehicle. The composite accumulator includes a base defining a first cavity and having a closed end, an open end, and a fluid port in communication with the first cavity for communicating a hydraulic fluid in or out of the first cavity, a cover disposed over the open end of the base, the cover defining a second cavity, an insert disposed within the second cavity, a piston disposed within the first cavity and the second cavity, the piston sealed to the insert and translatable along an axis, and a biasing member disposed axially between the piston and the insert, the biasing member configured to bias the piston towards the base. Both the base and the cover are a composite material and the insert is a metal.

In one aspect of the present invention the insert has a base portion in contact with a closed end of the cover and the biasing member contacts the base portion of the insert.

In another aspect of the present invention the insert includes a hole disposed in the base portion.

In another aspect of the present invention the cover includes a groove formed on an inner surface and the groove is in communication with the hole of the insert.

In another aspect of the present invention the groove communicates with an inlet or outlet port formed in the cover.

In another aspect of the present invention the base and cover each include a radial flange and the insert includes a radial bracket, and the radial flanges and the radial bracket are connected together by a fastener.

In another aspect of the present invention a support member is coupled to an outside surface of the cover.

In another aspect of the present invention the base and the cover are comprised of a polymeric material and the fastener and the support member are metal.

In another aspect of the present invention a pressure sensor is coupled to the base and is in communication with the first cavity.

In another aspect of the present invention the pressure sensor is molded into the base.

In another aspect of the present invention a solenoid is coupled to the base and is in communication with the fluid port.

In another aspect of the present invention the piston includes a disc face and an axially extending rim portion, wherein the disc face is oriented perpendicular to the axis and the rim portion extends towards the insert.

In another aspect of the present invention the rim portion has a distal end surface configured to contact the insert when the accumulator is fully charged with the hydraulic fluid.

In another aspect of the present invention the disc face has an outer diameter less than an outer diameter of the rim portion.

In another aspect of the present invention a first bushing is disposed between the piston and the base and a second bushing is disposed between the piston and a cylindrical wall of the insert.

In another aspect of the present invention a first and a second bushing are disposed between the piston and a cylindrical wall of the insert.

In another aspect of the present invention a seal is disposed radially between the piston and the cylindrical wall of the insert and located axially between the second bushing and the base portion of the insert.

In another aspect of the present invention the seal is disposed axially between first and second bushings.

Further areas of applicability will become apparent from the description provided herein. It should be understood that the description and specific examples are intended for purposes of illustration only and are not intended to limit the scope of the present disclosure.

DRAWING

The drawing described herein is for illustration purposes only and is not intended to limit the scope of the present disclosure in any way.

The drawing is a cross-sectional view of a composite accumulator according to the principles of the present invention.

DETAILED DESCRIPTION

The following description is merely exemplary in nature and is not intended to limit the present disclosure, application, or uses.

With reference to the drawing, an accumulator according to the principles of the present invention is generally indicated by reference number 10. The accumulator 10 is an energy storage device in which a non-compressible hydraulic fluid is held under pressure by an external source. In the example provided, the accumulator 10 is a spring type accumulator that provides a compressive force on the hydraulic fluid within the accumulator 10, as will be described in greater detail below. The accumulator 10 is preferably employed within the hydraulic control system of an automatic transmission (not shown) to enable stop-start operations or hybrid hydraulic operation, however, it should be appreciated that the accumulator 10 may be employed in various other environments, such as fuel injectors, air conditioning systems, etc., without departing from the scope of the present invention.

The accumulator 10 includes a base 12 and a cover 14 with an insert 15 disposed between the base 12 and the cover 14. Both the base 12 and the cover 14 are made from a thermoplastic or thermoset polymeric material. Examples of polymeric materials for use with the accumulator 10 may include, but are not limited to nylons, polyethylene terephthalic, and Polybutene tera phthalic. The polymeric material may include fillers. The amount of filler is dependant upon stiffness at 150 C, ranging from about 20 MPa to about 50 MPa, and in one embodiment, from about 30 MPa to about 40 MPa as measured by tensile stress strain method ISO 527. Examples of fillers suitable for use with the polymeric material include, but are not limited to, talc, mica, fiber glass, carbon fiber, and wood fiber. In one example the filler is present in the polymeric material from about 10% to about 60% by weight. In another example the filler material is present in an amount from about 20% to about 40% by weight. The insert 15 is made from a metal, such as aluminum, or steel and other alloys. In one embodiment the insert 15 is a stamped steel piece.

The base 12 is generally cylindrical in shape and includes an open end 16 and a closed end 18 opposite the open end 16. The open end 16 preferably has a larger diameter than a diameter proximate the closed end 18 thereby forming an annulus or radial flange 19. The open end 16 opens into a fluid chamber or cavity 20 defined by an inner surface 22 of the base 12. In one example the inner surface 22 of the base 12 is molded using a precision minimum draft die or mandrel to achieve accuracy and straightness without requiring a machining operation.

The cover 14 is generally cylindrical in shape and includes an open end 24 and a closed end 26 opposite the open end 24. The open end 24 opens into a cavity 28 defined by an inner surface 30 of the cover 14. In one example the inner surface 30 of the cover 14 is molded using a precision minimum draft die or mandrel to achieve accuracy and straightness without requiring a machining operation. The cover 14 further includes a radially extending flange 32 disposed proximate the open end 24.

The insert 15 is generally cylindrical and fits within the cavity 28 of the cover 14. The insert 15 includes a cylinder wall 34 and a base 36. The cylinder wall 34 contacts the inner surface 30 of the cover 14 while the base 36 contacts the closed end 26 of the cover 14. The insert 15 has an open end 38 opposite the base 36. The cover 15 includes a radial flange or bracket 40 that extends radially outward from the cylinder wall 34 proximate the open end 38.

The cover 14 and insert 15 are connected to the base 12 such that the bracket 40 of the insert 15 is disposed between the flange 19 of the base 12 and the flange 32 of the cover 14. The base 12, cover 14, and insert 15 are fixed or otherwise coupled together. For example, each of the flanges 19 and 32 the bracket 40 have one or more bolt holes 19A, 32A, and 40A formed therethrough, respectively. The bolt holes 19A, 32A, and 40A are radially aligned with one another. In the example shown, a threaded insert 42 is disposed in the bolt hole 19A and a bolt 44 is disposed through the bolt holes 19A, 32A, and 40A and the insert 42 to secure the cover 14 and insert 15 to the base 12. It should be appreciated that any number of bolts 44 may be employed to secure the cover 14 and insert 15 to the base 12 without departing from the scope of the present invention. Additionally, other mechanical fasteners, welds, and combinations thereof may be used to secure the cover 14 and insert 15 to the base 12. Alternatively, the insert 15 may be molded in place with the cover 14. Circumferential seals 46A and 46B are located on both axial sides of the bracket 40 and seal the insert 15 to the base 12 and cover 14, respectively.

An "L" shaped groove 47 is formed in the inner surface 30 and closed end 26 of the cover 14. The groove 47 communicates with an air hole 48 disposed in the base 36 of the insert 15 and with an air exhaust/intake port 49 disposed in the cover 14. Air within the cavity 28 communicates through the air hole 48, through the groove 47, and through the air exhaust/intake port 49, in order to vent the cavity 28.

A piston 50 is disposed within the cavities 20 and 28 between the base 12 and the insert 15. The piston 50 is translatable along an axis "A". The piston 50 includes a disc face 52 and an axially extending rim portion 54. The disc face 52 is disposed within the base 12 and the rim portion 54 extends towards the cover 14 and insert 15. The disc face 52 has an outer diameter that is less than the outer diameter of the rim portion 54. A sloped or angled surface 55 transitions between the disc face 52 and the rim portion 54. It should be appreciated that the surface 55 may not be sloped without departing from the scope of the present invention. The angled surface 55 provides a gap or space between the piston 50 and the inner surface 22 of the base 12 when the disc face 52 abuts the closed end 18 of the base 12. This gap allows oil to move around the disc face 52 and assists in the oil having sufficient contact surface to apply a force on the piston 50, as will be described in greater detail below.

The piston 50 is slidably disposed within the base 12 and the insert 15 and has outer diameters approximately equal to the inner diameters of the base 12 and the insert 15. The piston 50 is sealed to the cylinder wall 34 of the insert 15 by a radial seal 56. A first bushing 58 is disposed between the piston 50 and the cylinder wall 34 of the insert 15. The first bushing 58 is arranged to be on the "wet" or oil side of the radial seal 56, i.e., the first bushing 58 is disposed between the cavity 20 and the radial seal 56. Disposing the first bushing 58 on the oil side of the radial seal 56 assures that the first bushing 58 is lubricated and does not translate dry on the cylinder wall 34 which can potentially damaging the piston 50 or insert 15. A second bushing 60 is disposed between the piston 50 and the inner surface 22 of the base 12. In the example provided, the bushings 58 and 60 are spaced axially as far apart as practical. It should be appreciated that the locations of the bushings 58 and 60 as well as the radial seal 56 may vary without departing from the scope of the present invention. For example, in an alternate embodiment, both bushings 58 and 60 may be disposed between the piston 54 and the cylinder wall 34 of the insert 15. In another embodiment, the radial seal 56 may be disposed axially between the bushings 58 and 60.

A pair of biasing members or springs 62 is disposed within the cavity 28 of the cover 14 between the base 36 of the cover 15 and the piston 50. One end of the springs 62 contact the base 36 of the cover 15 and another end of the springs 62 contact the piston 50 radially inwardly of the rim portion 54. The springs 62 bias the piston 50 towards the base 12.

The base 12 has an inlet/outlet port 70 that communicates with a solenoid 72 disposed in the base 12. The inlet/outlet 70 communicates with the cavity or fluid chamber 20. The solenoid 72 is operable to control the flow of oil in and out of the accumulator 50 by selectively closing and opening the inlet/outlet 70.

In one embodiment, the accumulator 10 further includes a pressure sensor 76 that communicates with the cavity or fluid chamber 20. The pressure sensor 76 is connected to the base 12. In a preferred embodiment the pressure sensor 76 is molded into the base 12 to increase the material compatibility between the pressure sensor 76 and the plastic base 12, however, the pressure sensor 76 may be threaded into the base 12 or may be bolted into the base 12 without departing from the scope of the present invention.

In another embodiment, the accumulator 50 is secured to a transmission housing or other component (not shown) by a metal bolt or other member 80. The bolt 80 is disposed through a bore 82 formed in the cover 14. The bolt 80 provides additional strength and support to the accumulator 50. The bolt 80 may be concentrically aligned with the bore 82 using guide pins or a molded slip fit, as described above.

During operation of the accumulator 10, the accumulator 10 is charged when pressurized hydraulic fluid or oil enters the fluid chamber 20 via the solenoid 72 and inlet/outlet 70 and contacts the piston 50. The pressurized oil creates a force on the disc face 52 of the piston and forces the piston 50 against the biasing force of the springs 62. When the rim portion 54 of the piston 50 contacts the base 36 of the insert 15, the piston 50 is in its maximum charged state. Accordingly, the forces acting on the insert 15 are distributed to the closed end 26 of the cover 14. This reaction force is then transferred to the bolts 36 and 80. By distributing the reaction forces of the piston 50 and springs 62 on the metal insert 15 and the metal connections between the base 12 and cover 14 and between the accumulator 50 and a fixed mount, the stress on the base 12 and cover 14 is reduced and the base 12 and cover 14 are able to handle a greater force load. In addition, the insert 15 provides bore properties required for good sealing between the piston 50 and the insert 15 including a particular diameter tolerance and surface finish. These features allow the base 12 and cover 14 to be manufactured using a plastic molding without reducing the charge capacity of the accumulator 10. Increased manufacturing flexibility offers cost savings and additionally weight savings which in turn improve the efficiency of the motor vehicle. In addition, the base 12 and cover 14 may be precision molded to provide concentricity between the base 12 and the cover 14 through precise molded concentric relationships between the inner surfaces 22 and 30.

The description of the invention is merely exemplary in nature and variations that do not depart from the general essence of the invention are intended to be within the scope of the invention. Such variations are not to be regarded as a departure from the spirit and scope of the invention.

The following is claimed:

1. An accumulator comprising:
    a base defining a first cavity and having a closed end, an open end, and a fluid port in communication with the first cavity for communicating a hydraulic fluid in or out of the first cavity;
    a cover disposed over the open end of the base, the cover having a closed end and an inner surface that defines a second cavity;
    a support member coupled to an outside surface of the cover;
    an insert disposed within the second cavity, the insert having a cylindrical wall that defines a bore and a base portion, wherein the cylindrical wall contacts the inner surface of the cover and the base portion contacts the closed end of the cover;
    a fastener connecting the cover and the base;
    a piston disposed within the first cavity and the bore of the insert, wherein the piston is sealed to the cylindrical wall of the insert and is translatable along an axis; and
    a biasing member disposed axially between the piston and the base portion of the insert, the biasing member configured to bias the piston towards the base,
    wherein the insert includes a hole disposed in the base portion and the cover includes a groove formed on the inner surface and the closed end, wherein the groove is in communication with the hole of the insert and with a port in an outer surface of the cover, and
    wherein the base and the cover are a composite material and the insert, the fastener, and the support member are a metal.

2. The accumulator of claim 1 wherein the base and cover each include a radial flange and the insert includes a radial bracket, and wherein the radial flanges and the radial bracket are connected together by a fastener.

3. The accumulator of claim 1 further comprising a pressure sensor coupled to the base and in communication with the first cavity.

4. The accumulator of claim 3 wherein the pressure sensor is molded into the base.

5. The accumulator of claim 1 further comprising a solenoid coupled to the base and in communication with the fluid port.

6. The accumulator of claim 1 wherein the piston includes a disc face and an axially extending rim portion, wherein the disc face is oriented perpendicular to the axis and the rim portion extends towards the insert.

7. The accumulator of claim 6 wherein the rim portion has a distal end surface configured to contact the insert when the accumulator is fully charged with the hydraulic fluid.

8. The accumulator of claim 7 wherein the disc face has an outer diameter less than an outer diameter of the rim portion.

9. The accumulator of claim 1 further comprising a first bushing disposed between the piston and the base and a second bushing disposed between the piston and a cylindrical wall of the insert.

10. The accumulator of claim 9 further comprising a seal disposed radially between the piston and a cylindrical wall of the insert and located axially between the second bushing and the base portion of the insert.

11. The accumulator of claim 1 further comprising a first bushing disposed between the piston and a cylindrical wall of the insert and a second bushing disposed between the piston and the cylindrical wall of the insert.

12. The accumulator of claim 11 further comprising a seal disposed radially between the piston and the cylindrical wall of the insert and located axially between the first bushing and the second bushing.

* * * * *